US011758850B2

(12) United States Patent
Kumar et al.

(10) Patent No.: US 11,758,850 B2
(45) Date of Patent: Sep. 19, 2023

(54) COMBINE HEADER WITH SPLIT AUGERS AND METHOD OF USING THE SAME

(71) Applicant: DEERE & COMPANY, Moline, IL (US)

(72) Inventors: Sumit Kumar, Fatahabad (IN); Eric Hans Pierre Pellegrini, Sarreguemines (FR); Justin C. Freehill, Fenton, IL (US); Bryan R. Yanke, Eldridge, IA (US); Duane M. Bomleny, Geneseo, IL (US); Joshua R. Pierson, East Moline, IL (US); Lawrence F. Kane, Geneseo, IL (US); Balaji Parthasarathy, Bettendorf, IA (US)

(73) Assignee: DEERE & COMPANY, Moline, IL (US)

( * ) Notice: Subject to any disclaimer, the term of this patent is extended or adjusted under 35 U.S.C. 154(b) by 390 days.

(21) Appl. No.: 16/934,317

(22) Filed: Jul. 21, 2020

(65) Prior Publication Data

US 2021/0092902 A1 Apr. 1, 2021

Related U.S. Application Data

(60) Provisional application No. 62/907,975, filed on Sep. 30, 2019.

(51) Int. Cl.
A01D 61/00 (2006.01)
A01D 61/02 (2006.01)
A01D 41/06 (2006.01)

(52) U.S. Cl.
CPC ........... *A01D 61/004* (2013.01); *A01D 41/06* (2013.01); *A01D 61/008* (2013.01); *A01D 61/02* (2013.01)

(58) Field of Classification Search
CPC .... A01D 61/004; A01D 41/06; A01D 61/008; A01D 61/02; A01D 57/20; A01D 41/14
See application file for complete search history.

(56) References Cited

U.S. PATENT DOCUMENTS 3,977,164 A * 8/1976 Ashton ................. A01D 61/00
198/666
4,300,333 A * 11/1981 Anderson ............ A01D 61/008
198/666
5,673,543 A 10/1997 Richardson et al.
6,047,532 A * 4/2000 O'Halloran .......... A01D 61/008
56/95
8,166,738 B1* 5/2012 Coers .................. A01D 61/002
56/181

(Continued)

FOREIGN PATENT DOCUMENTS

CN 109729820 A 5/2019
EP 3270681 B1 12/2018

*Primary Examiner* — Arpad F Kovacs
(74) *Attorney, Agent, or Firm* — Taft Stettinius & Hollister LLP; Stephen F. Rost

(57) ABSTRACT

A harvesting assembly for harvesting a crop includes a frame, a cutting knife configured to cut crop, a feed drum, a draper assembly, a first auger assembly, and a second auger assembly. The draper assembly and the auger assemblies are configured to move the cut crop toward the feed drum. The auger assemblies each include a first auger, a second auger, and a mounting unit coupled to the frame and coupled between the first auger and the second auger to support the first auger and the second auger during rotation of the augers.

18 Claims, 6 Drawing Sheets

(56) References Cited

U.S. PATENT DOCUMENTS

| | | | |
|---|---|---|---|
| 9,814,181 B2* | 11/2017 | Wenger | A01D 47/00 |
| 10,292,330 B2 | 5/2019 | Borry | |
| 10,820,509 B2* | 11/2020 | Schroeder | A01D 61/004 |
| 2003/0110750 A1* | 6/2003 | Farley | A01D 61/008 |
| | | | 56/12.4 |
| 2008/0295474 A1* | 12/2008 | Tippery | A01D 57/20 |
| | | | 56/153 |
| 2009/0217639 A1* | 9/2009 | Lohrentz | A01D 75/182 |
| | | | 56/364 |
| 2013/0219847 A1 | 8/2013 | Miller et al. | |
| 2014/0075906 A1 | 3/2014 | Heim et al. | |
| 2014/0075907 A1* | 3/2014 | Ritter | A01D 45/021 |
| | | | 56/103 |
| 2018/0054964 A1* | 3/2018 | Füchtling | A01D 41/127 |
| 2019/0029181 A1* | 1/2019 | Modak | A01D 61/008 |
| 2019/0313581 A1* | 10/2019 | Sorensen | A01D 41/14 |
| 2020/0000037 A1* | 1/2020 | Washburn | A01D 61/008 |
| 2020/0037502 A1* | 2/2020 | Oberlander | A01D 61/008 |

* cited by examiner

COMBINE HEADER WITH SPLIT AUGERS AND METHOD OF USING THE SAME

RELATED APPLICATIONS

This application claims priority to U.S. Provisional Application Ser. No. 62/907,975, filed Sep. 30, 2019, the disclosure of which is hereby incorporated by reference in its entirety.

FIELD OF THE DISCLOSURE

The present disclosure relates to a combine harvester, and more particularly, to a combine header for a combine harvester, wherein the combine header includes a split top auger on a draper platform.

BACKGROUND

Agricultural machines, such as a combine harvester, include different portions or sections for cutting crop and moving the crop through the harvester. A header for an agricultural combine harvester is arranged to be moved in a forward direction over a field. The header comprises a laterally extending frame supporting a laterally extending cutter bar. Laterally extending and generally vertical back sheets are disposed along the back of the header on left and right sides of the header. The back sheets have a central aperture therebetween. Left and right lateral belt conveyors, also called left and right draper belt conveyors, are supported on the frame. Each of the draper conveyors includes a draper belt having a feeding direction from an outer side end towards a center of the header. A central conveyor, also called a center draper belt conveyor, is disposed between the laterally inner ends of the left and right draper belt conveyors to receive cut crop material and convey it rearward through the central aperture. Rotationally drivable left and right crop rollers are supported on the frame forward of the back sheets and above the left and right draper belt conveyors.

The draper header includes a first auger located above the left draper belt conveyor and a second auger located above the right draper belt conveyor. The augers may extend a great distance in the lateral direction, and the augers may include additional components used to manipulate cut crop. Challenges may arise when the augers experience counter-productive movement relative to the frame based on the length of the augers or components included in the augers.

SUMMARY

In an illustrative embodiment, a harvesting assembly for harvesting a crop including a frame; a cutting knife configured to cut crop; a draper assembly including a first side draper configured to move cut crop in a lateral direction, a second side draper configured to move cut crop in a lateral direction, and a center draper positioned between the first side draper and the second side draper; a feed drum disposed above the center draper; and a first auger assembly. The first auger assembly includes: a first auger positioned above the first side draper, the first auger including (i) a first cylinder having an outer surface and (ii) a first flight defining an outer diameter of the first auger and extending from the outer surface of the first cylinder, a second auger positioned above the first side draper between the first auger and at least a portion of the feed drum, the second auger including (i) a second cylinder having an outer surface and (ii) a second flight defining an outer diameter of the second auger and extending from the outer surface of the second cylinder, and a first mounting bracket coupled to the frame and the first auger and the second auger to support the first auger and the second auger above the first side draper. The first mounting bracket is positioned laterally between the first auger and the second auger.

In some embodiments, the first auger is fixed relative to the second auger during operation of the harvesting assembly. In some embodiments, the first cylinder and the second cylinder share a common longitudinal axis during operation of the harvesting assembly.

In some embodiments, the second auger includes a plurality of fingers extending from the outer surface of the second cylinder, and the first auger is devoid of fingers. In some embodiments, the plurality of fingers are retractable such that the plurality of fingers move relative to the common longitudinal axis during rotation of the first auger and the second auger. In some embodiments, the plurality of auger fingers are stationary fingers and are fixed with respect to the common longitudinal axis during rotation of the first auger and the second auger.

In some embodiments, the first mounting bracket is coupled to a monolithic member of the frame, and the monolithic member extends in the lateral direction adjacent a portion of the first auger and adjacent a portion of the second auger such that the frame prevents the first auger from folding relative to the second auger.

In some embodiments, the first auger assembly includes a rotational mechanism that is coupled to the first auger and the second auger and configured to transfer torque between the first auger and the second auger. The first auger and the second auger are fixed relative to the rotational mechanism during operation of the harvesting assembly. At least one of the first auger and the second auger is removable from the rotational mechanism. At least one of the first auger and the second auger is fixable relative to the rotational mechanism in a plurality of positions each defined by a different degree of rotation about a common longitudinal axis of the first cylinder and the second cylinder. The first mounting bracket includes a first portion fixed relative to the frame and a second portion coupleable to the first portion, the rotational mechanism is positioned in a bearing supported by the second portion, and the second portion is moveable vertically relative to the first portion to adjust the height of the first auger and the second auger relative to the frame.

In some embodiments, the harvesting assembly further includes a second auger assembly including: a third auger positioned above the second side draper, the third auger including (i) a third cylinder having an outer surface and (ii) a third flight defining an outer diameter of the third auger and extending from the outer surface of the third cylinder, a fourth auger positioned above the second side draper between the third auger and at least a portion of the feed drum, the fourth auger including (i) a fourth cylinder having an outer surface and (ii) a fourth flight defining an outer diameter of the fourth auger and extending from the outer surface of the fourth cylinder, and a second mounting bracket coupled to the frame, the third auger, and the fourth auger to support the third auger and the fourth auger above the second side draper. The third cylinder and the fourth cylinder share a common longitudinal axis extending in the lateral direction, about which the third auger and the fourth auger are configured to rotate. The second mounting bracket is positioned laterally between the third auger and the fourth auger. In some embodiments, the first cylinder and the third cylinder share a common longitudinal axis.

In another embodiment, a harvesting assembly for harvesting a crop includes a frame; a feed drum coupled to the frame; and a first auger assembly. The first auger assembly includes: a first auger configured to rotate about a longitudinal axis that extends in the lateral direction, a second auger configured to rotate about the longitudinal axis, and a mounting bracket fixed to the frame and coupled to the first and second auger. The second auger is positioned laterally between the mounting bracket and at least a portion of the feed drum during operation of the harvesting assembly, and the second auger is removably coupled to the mounting bracket.

In some embodiments, the second auger is fixable in a plurality of positions relative to the first auger each defined by a different degree of rotation of the second auger relative to the first auger about the longitudinal axis. The mounting bracket is coupled to a monolithic member of the frame, and the monolithic member extends in the lateral direction adjacent a portion of the first auger and adjacent a portion of the second auger such that the monolithic member prevents the first auger from folding relative to the second auger.

In some embodiments, the second auger includes a plurality of retractable fingers extending from an outer surface of the second cylinder. The first auger is devoid of fingers.

In another embodiment, a method of operating an agricultural harvester includes: rotating a first auger and a second auger fixed to the first auger about a longitudinal axis that extends in the lateral direction; and extending and retracting, relative to the longitudinal axis, a plurality of fingers disposed on the second auger. Rotating the second auger about the longitudinal axis includes transferring torque from the first auger to the second auger through a rotational mechanism supported by a mounting bracket that is positioned laterally between the first auger and the second auger.

In some embodiments, disengaging the rotational mechanism from at least one of the first auger and the second auger; rotating at least one of the first auger and the second auger relative to the rotational mechanism about the longitudinal axis; and re-engaging rotational mechanism with the at least one disengaged first auger and second auger.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIGS. 7A and 7B illustrate an exemplary finger in a fixed position and a retracted position, respectively.

Corresponding reference numerals are used to indicate corresponding parts throughout the several views.

DETAILED DESCRIPTION

Figure 1:
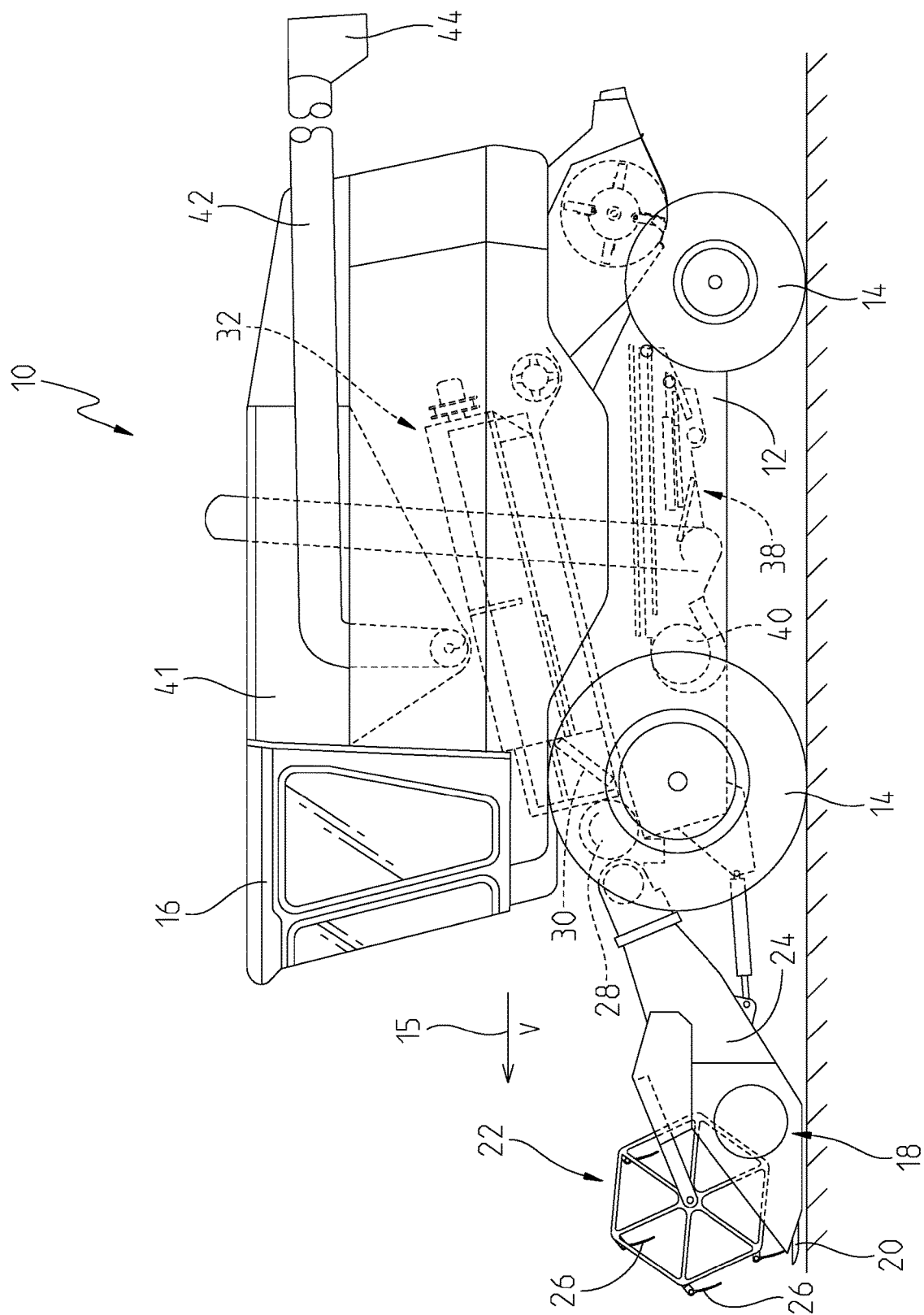
FIG. 1 is an elevational side view of an agricultural combine harvester.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

FIG. 1 illustrates one embodiment of an agricultural combine harvester 10 including a chassis 12 with wheels 14 in contact with the ground. Wheels 14 are coupled to the chassis 12 and are used for propulsion of the combine 10 in a forward operating or travelling direction 15. The operation of the combine 10 is controlled from an operator's cab 16. The operator's cab 16 includes one or more controls (not shown) for controlling the operation of the harvester 10. A draper header 18 is disposed at a forward end of the harvester 10 and includes a cutting knife or cutterbar 20 to cut crop being harvested. The cut crop includes any variety and types of different crops including wheat, soybeans, sorghum, barley, and other grains. At substantially the same time the grain is cut, a pickup reel assembly 22, rotates as understood by those skilled in the art, to move or force the cut crop toward a slope conveyor 24. The pickup reel assembly 22 includes a plurality of fingers 26. The fingers 26 lift and move the cut crop over the cutterbar 20, as well as comb through the cut crop to provide a degree of separation of the crop. The cut crop is conducted by a guide drum 28 and directed by the slope conveyor 24 to an inlet transition section 30. The inlet transition section 30 directs the cut crop to an axial harvested crop processing arrangement 32.

The crop processing arrangement 32 includes, in one or more embodiments, a rotor housing, a rotor including a hollow drum, a charging section, a threshing section, and a separating section, as is understood by those skilled in the art. A conveyor receives grain from the crop processing arrangement 32 and moves the grain to an outlet of the conveyor where it is deposited in a collection vehicle, such as a grain wagon.

Grain and chaff that fall through the crop processing arrangement may be directed to a cleaning system 38 with a blower 40. The cleaning system 38 removes the chaff and guides the clean grain to an elevator for clean grain (not shown). The elevator deposits the clean grain in a tank 41 that is unloaded by a conveyor 42 having an outlet 44 to a wagon, trailer, or truck (not shown).

Figure 2:
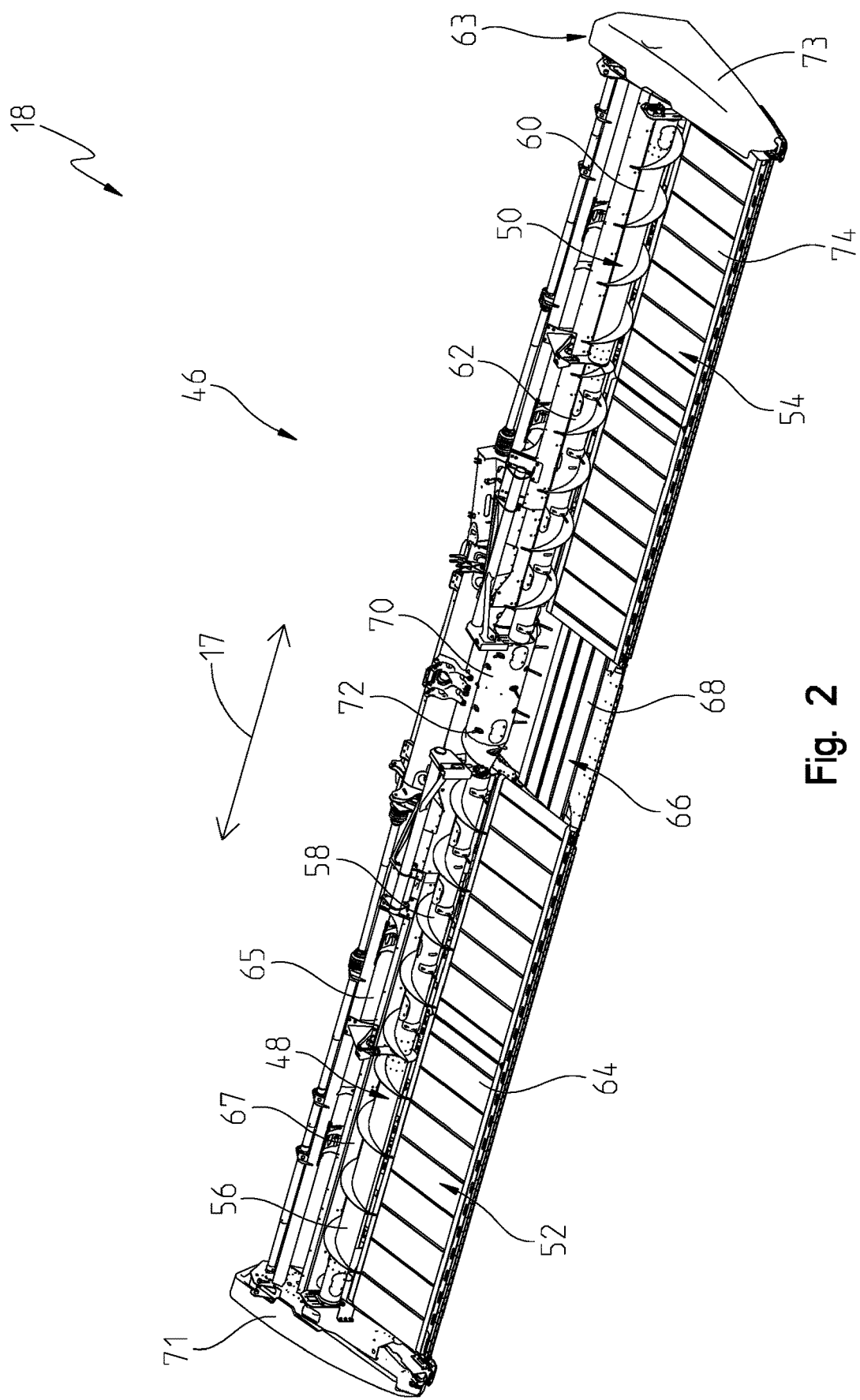
FIG. 2 is a perspective view of a draper header.

As further illustrated in FIG. 2, the draper header 18 includes a crop auger assembly 46 including a first auger assembly 48 and a second auger assembly 50. The first auger assembly 48 is positioned above a first side draper 52, and the second auger assembly 50 is positioned above a second side draper 54. As used here, what is meant by "above" is that the auger assemblies 48, 50 are positioned at a greater height than the drapers 52, 54. In some embodiments, the auger assemblies 48, 50 may be positioned directly over or atop the drapers 52, 54. In some embodiments, the auger assemblies 48, 50 may be positioned above and rearward of the drapers 52, 54.

The first auger assembly 48 includes a first auger 56 and a second auger 58 each positioned above the first side draper 52. The second auger assembly 50 includes a third auger 60 and a fourth auger 62 each positioned above the second side draper 54. It should be appreciated that the first and second auger assemblies 48 and 50 are substantially identical to one another, except that their respective augers are arranged to direct crop in opposite directions, i.e., both toward the center of the draper header 18. As such, the first auger 56 is substantially identical to the third auger 60, and the second auger 58 is substantially identical to the fourth auger 62, except that the first auger 56 is a mirror image of the third auger 60 and the second auger 58 is a mirror image of the fourth auger 62 across a plane extending transverse to the augers through the center of the draper header 18. Therefore, it should be appreciated that any disclosure regarding the components of the first auger assembly 48 applies with equal force to the respective components of the second auger assembly 50.

Referring still to FIG. 2, the first side draper 52 includes a belt 64 supported by rollers that move a top surface of the belt 64 laterally toward a center draper 66. The second side draper 54 includes a belt 74 supported by rollers that move a top surface of the belt 74 laterally toward the center draper 66. As such, the center draper 66 is positioned laterally between the first side draper 52 and the second side draper 54. The center draper 66 includes a belt 68 supported by rollers that move the top surface of the belt 68 in the rearward direction toward a feed drum 70. Each side draper belt 64, 74 includes a front edge and rear edge, and the front edge is located closest to the cutting knife 20.

In some embodiments, the feed drum 70 includes fingers 72 configured to manipulate cut crop fed to the feed drum 70. In some embodiments, the fingers 72 are retractable fingers configured to engage and compress cut crop when the fingers are in an extended position. The retractable fingers are configured to release the compressed cut crop when the fingers move to a retracted position.

As the draper header 18 moves forward to cut crop, the pickup reel assembly 22, with the action of the fingers 26, aids in picking up crop cut by the cutter bar 20 to locate the cut crop on the left side draper belt 64, the center draper belt 68, and the right side draper belt 74. The cut crop located on the draper belts 64 and 74 is moved toward the center draper belt 68 and toward the feed drum 70. As crop builds up on the draper belts 64 and 74, the amount of crop located between a leading edge and a rear edge of each belt 64, 74 increases and extends upwardly toward the augers 56 and 58. The spatial relationship between and the relative speeds of the augers and the draper belts is important to ensure that crop is moved in the most efficient manner toward the feed drum 70. For example, if the special relationship is inadequate or the speeds of the components are misaligned, the crop may slide along the back sheet of the header or become lodged and immobilized between the belts and the augers. Thus, a careful, predetermined arrangement is identified for the spatial relationship between the augers and the belts and the speed of rotation of the augers relative to the speed of lateral movement of the belts. Without such a careful, predetermined arrangement, the header cannot function as efficiently as desired.

Referring still to FIG. 2, the draper header 18 includes a frame 63 that extends in a lateral direction, as shown by the arrow 17, between terminating ends 71, 73. In one embodiment, the frame 63 is a rigid frame such that the entire length of the header is rigidly supported. In another embodiment, frame 63 is not a rigid frame, but is instead a flexible frame or a hinged frame. In one embodiment of the rigid frame, the frame 63 includes monolithic members. The monolithic members may be referred to as a one-piece support bar 65 and a one-piece back sheet 67.

In some embodiments, the support bar 65 is coupled to terminating end 71 of the frame 63 and extends in the lateral direction inwardly toward a central portion of the header 18. The support bar 65 extends in the lateral direction adjacent at least a portion of the first auger 56 and adjacent at least a portion of the second auger 58. Additionally, the support bar 65 is indirectly coupled to the first auger 56 and the second auger 58, as will be described in greater detail below. As such, the one-piece support bar 65 prevents the first auger 56 from folding relative to the second auger 58. In some embodiments, the back sheet 67 is coupled to terminating end 71 of the frame 63 and extends in the lateral direction inwardly toward a central portion of the header 18. The back sheet 67 extends in the lateral direction adjacent at least a portion of the first auger 56 and adjacent at least a portion of the second auger 58. Additionally, the back sheet 67 is indirectly coupled to the first auger 56 and the second auger 58, as will be described in greater detail below. As such, the one-piece back sheet 67 prevents the first auger 56 from folding relative to the second auger 58.

Figure 3:
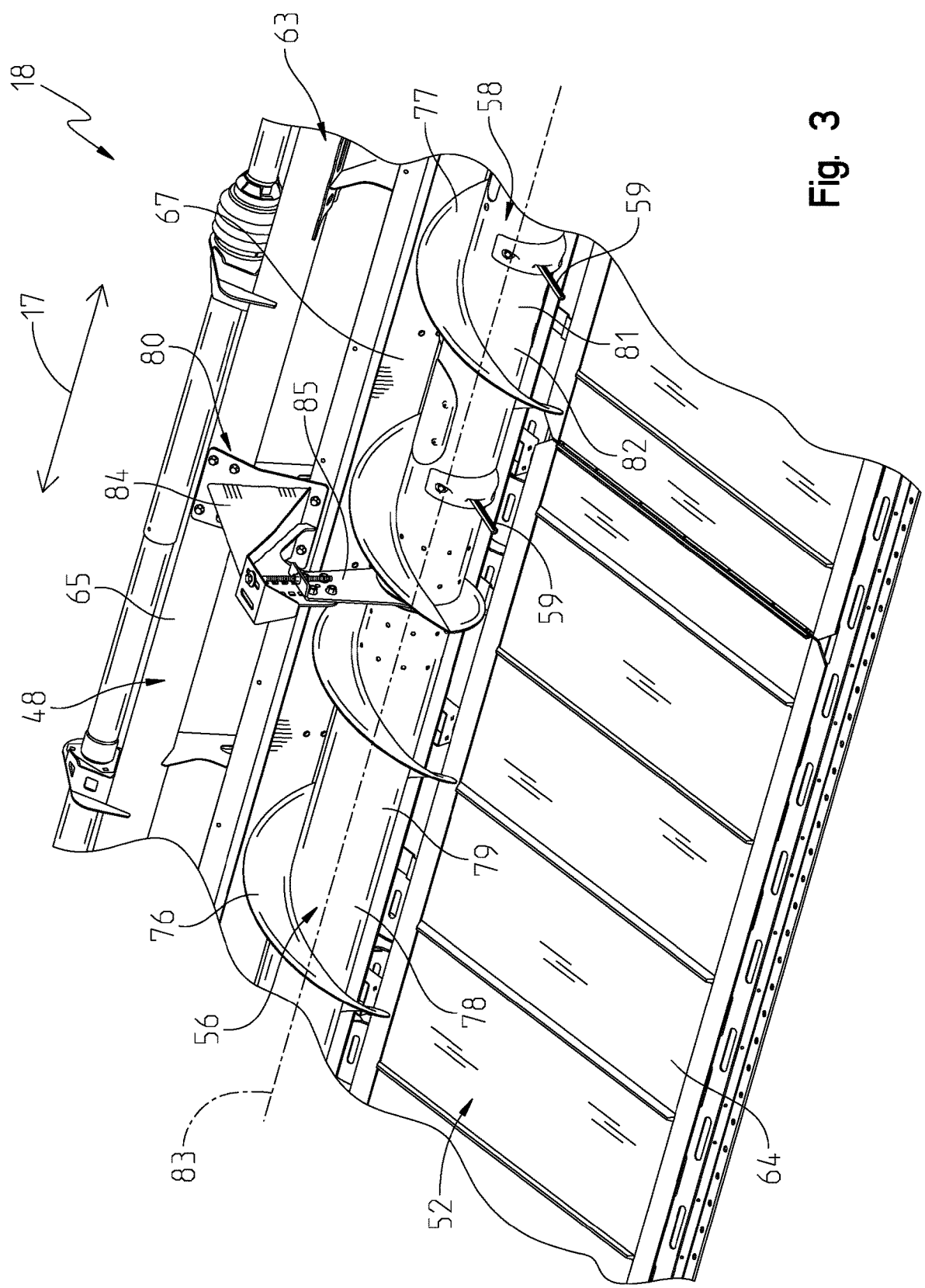
FIG. 3 is a perspective view of an auger assembly included in the draper header of FIG. 2.

FIG. 3 illustrates a central portion of auger assembly 48. The first auger 56 includes a vane or flight 76 which is spirally located about a first cylinder 78 that extends laterally alongside the left side draper belt 64. The first cylinder 78 includes an outer surface 79, and the flight 76 extends radially outwardly from the outer surface 79 to define an outer diameter of the first auger 56. The second auger 58 includes a vane or flight 77 which is spirally located about a second cylinder 82 that extends along the left side draper belt 64. The second cylinder 82 includes an outer surface 81, and the flight 77 extends radially outwardly from the outer surface 81 to define an outer diameter of the second auger 58. The second cylinder 82 is positioned adjacent to the first cylinder 78 and laterally between the first cylinder 78 and at least a portion of the feed drum 70 (see FIG. 2).

In the illustrative embodiment, the first cylinder 78 and the second cylinder 82 share a common longitudinal axis 83. The longitudinal axis 83 extends in the lateral direction as referenced by the arrow 17. Each cylinder 78, 82 is configured to rotate about the longitudinal axis 83 such that the flights 76, 77 urge agricultural material laterally toward the feed drum 70. In some embodiments, such as those employing the one-piece support bar 65 and the one-piece back sheet 67, the first cylinder 78 and the second cylinder 82 share the common longitudinal axis 83 at all times during operation of the harvesting assembly 10. In some embodiments, each of the augers 56, 58, 60, 62 rotate about and share the common longitudinal axis 83.

Referring still to FIG. 3, the second auger 58 includes a plurality of fingers 59 extending radially outwardly from the outer surface 81 of the second cylinder 58, and the first auger 56 is devoid of fingers. In some embodiments, the first auger 56 may also include a plurality of fingers, such as the fingers 59. In other embodiments, the first auger 56 may include a plurality of fingers, such as the fingers 59, and the second auger 58 may be devoid of fingers. In some embodiments, the fingers 59 may be retractable (FIG. 7B) such that the fingers move relative to the longitudinal axis 83 during rotation of the auger. The fingers 59 may move between an extended position in which the fingers 59 extend radially beyond the flight of the auger and a retracted position in which the flight extends radially beyond the fingers. In other embodiments, the fingers may be stationary fingers (FIG. 7A) such that the fingers do not move relative to the longitudinal axis 83 during rotation of the auger.

The inclusion of fingers 59 on an auger may cause counterproductive movement during rotation of the auger. A reduction or elimination in the counterproductive movement may be achieved with a mounting bracket, such as a mounting bracket 80, which is described in greater detail below.

As shown in FIG. 3, the first auger assembly 48 includes the mounting bracket 80. The mounting bracket 80 includes a first portion 84 fixedly coupled to the header frame 63 and a second portion 85 removably coupled to the first portion 84. In the illustrative embodiment, a first side of the first portion 84 is fixed to the support bar 65 of the frame 63, and a second side of the first portion 84 is fixed to the back sheet 67 of the frame 63.

In some embodiments, the mounting bracket 80 is a height adjustable mounting bracket. As such, the vertical position of the second portion 85 may be adjusted relative to the position of the first portion 84 (and thereby relative to the frame 63). In such embodiments, the first portion 84 of the mounting bracket 80 may include a plurality of apertures defined at different heights along the first portion 84. Fasteners may be inserted into one or more of the apertures defined in the first portion 84. Additionally, the fasteners may be inserted through an aperture defined in the second portion 85 to secure the second portion 85 to the first portion 84. The fasteners may be removed and reinserted into various apertures of the first portion 84 to adjust the height of the second portion 85 relative to the header frame 63. It should be appreciated that while one embodiment of a height adjustable mounting bracket has been described above, other adjustment features may be used to adjust the height of the first portion 84 relative to the second portion 85.

Figure 4:
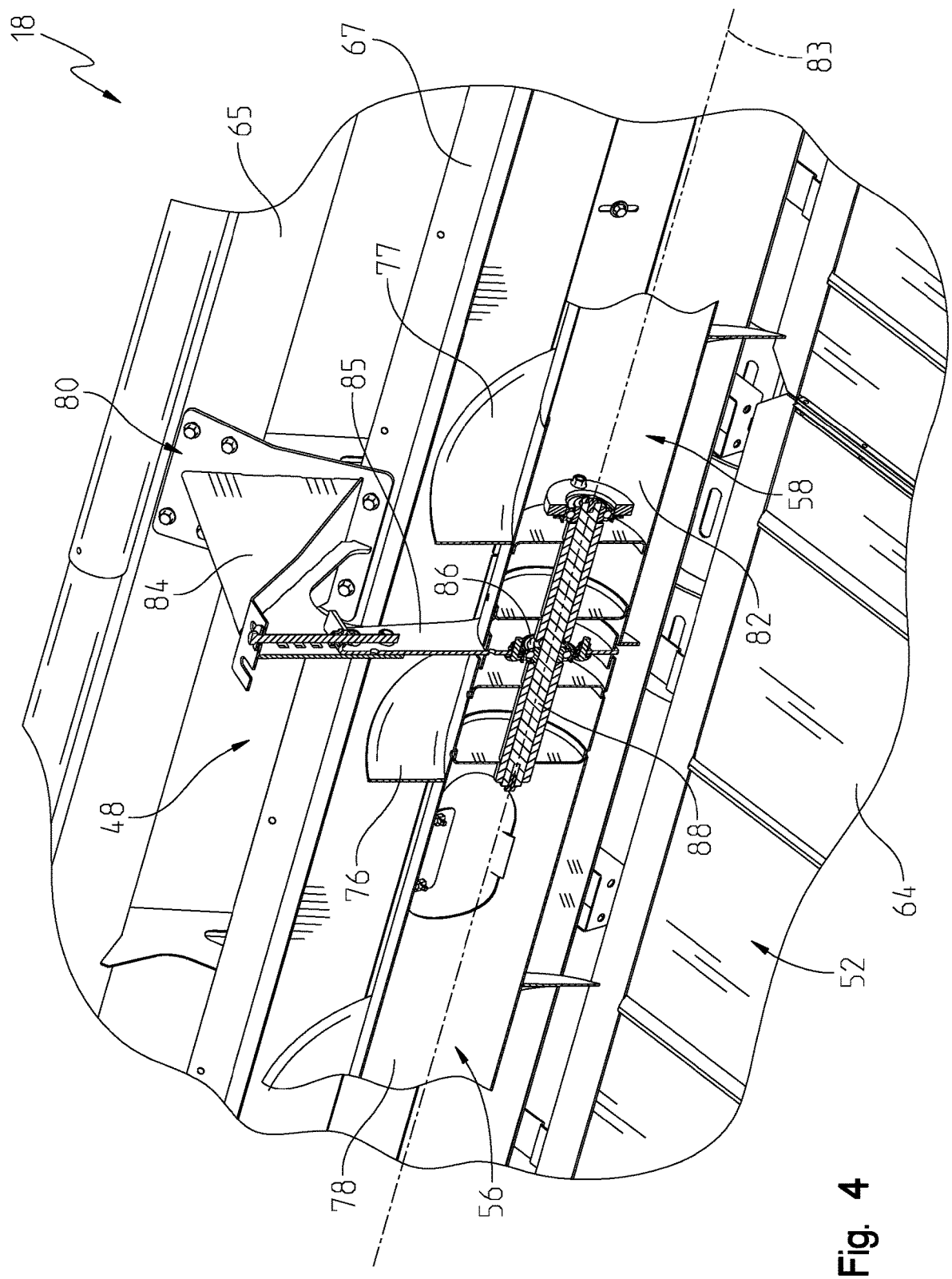
FIG. 4 is a sectional perspective view of the auger assembly of FIG. 3.

As shown in FIG. 4, the second portion 85 of the mounting bracket 80 is coupled to and configured to support a bearing 86. A rotational mechanism 88 may be positioned within and supported by the bearing 86. The bearing 86 thereby facilitates rotation of the rotational mechanism 88 relative to the header frame 63. The rotational mechanism 88 is coupleable to the first auger 56 and the second auger 58. Additionally, the rotational mechanism 88 is configured to transfer torque between the first auger 56 and the second auger 58, as will be described in more detail below. In this configuration, the mounting bracket 80, and the rotational mechanism 88 coupled thereto, support the first auger 56 and the second auger 58 above the first side draper 52.

Figure 5:
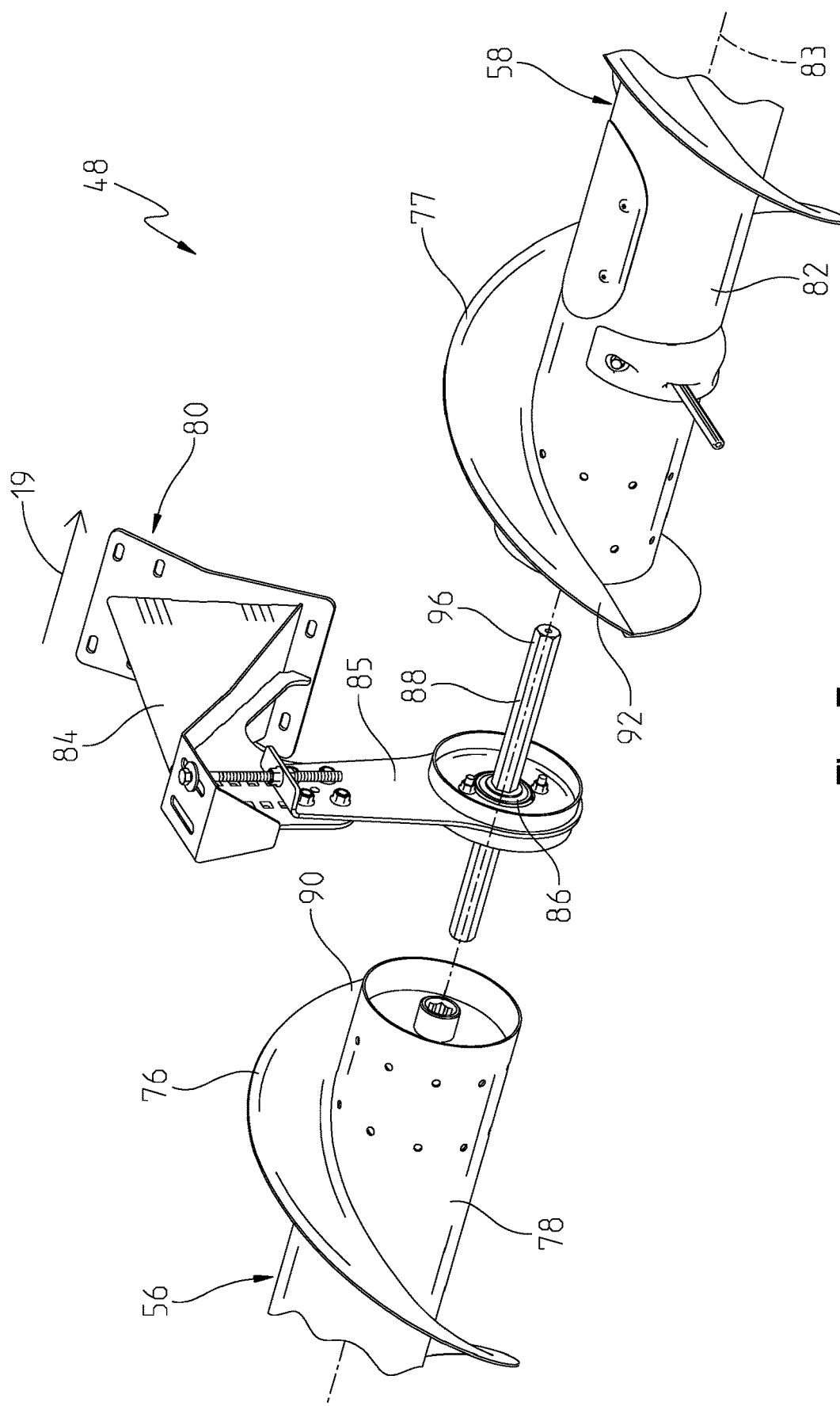
FIG. 5 is an exploded view of an auger assembly.

Referring now to FIG. 5, it should be appreciated that the rotational mechanism 88 is removably coupled to the first auger 56 and the second auger 58. In use, as the first auger 56 rotates, the first auger 56 is configured to convey agricultural material laterally inward toward the second auger 58. As such, the agricultural material is urged by the flight 76 laterally inward, as shown by the arrow 19. Continued rotation of the first auger 56 urges the agricultural material to move laterally inward into contact with the flight 77 of the second cylinder 82. Challenges can arise transferring the agricultural material from the first cylinder 78 to the second cylinder 82. As such, it should be appreciated that each auger 56, 58 may be coupled to the rotational mechanism in a plurality of different rotational positions to achieve an optimized transfer of material between the first cylinder 78 and the second cylinder 82. Specifically, when the first auger 56 and the second auger 58 are fixed relative to the rotational mechanism 88, a laterally-inner end 90 of flight 76 is offset between 0-360 degrees from a laterally-outer end 92 of the flight 77. Either one or both of the augers 56, 58 may be disengaged from and rotated relative to the rotational mechanism 88 about the longitudinal axis 83. Subsequently, the rotated auger may be fixed to the rotational mechanism 88 such that the ends 90, 92 of the flights 76, 77 are offset by a desired degree of rotation. In other words, the first and second augers 56, 58 are fixable in a plurality of different rotational positions relative to each other, and each of the plurality of different positions is defined by a different degree of rotation of one auger 56, 58 relative to the other auger 56, 58 about the longitudinal axis 83.

In an illustrative embodiment, as shown in FIG. 5, the rotational mechanism 88 is a hexagonal shaft 96. In such an embodiment, the second auger 58 may be fixed to the hexagonal shaft 96 in six different positions relative to the shaft 96. Thus, when the first auger 56 is fixed to the shaft 96, the second auger 58 may be rotated in sixty degree increments relative to the first auger 56 to define the plurality of different rotational positions. Likewise, the first auger 56 may be fixed to the hexagonal shaft 96 in six different positions. Thus, when the second auger 58 is fixed to the shaft 96, the first auger 56 may be rotated in sixty degree increments relative to the second auger 58. It should be appreciated that while a hexagonal shaft is shown in FIG. 5, the shaft could include any number of sides sufficient to facilitate the plurality of different rotational positions while still facilitating torque transfer between the augers 56, 58.

Figure 6:
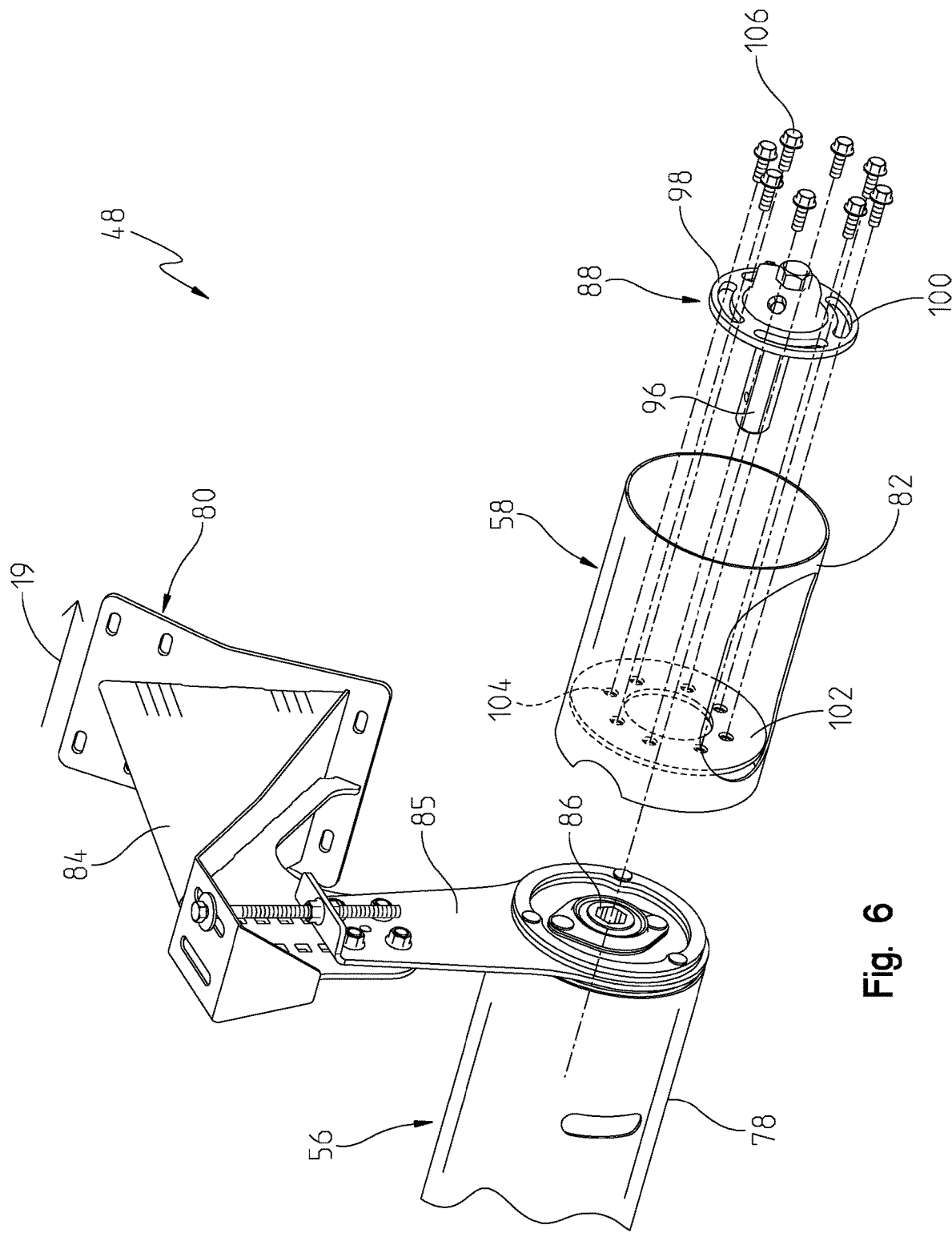
FIG. 6 is an exploded view of another auger assembly.

In another illustrative embodiment, such as that shown in FIG. 6, the rotational mechanism 88 may include a shaft, such as the shaft 96, and a slide plate 98 coupled to the shaft 96. The slide plate 98 may define a plurality of elongated slots 100. As described with reference to FIG. 5, one of the augers 56, 58 may be fixed to the shaft 96 shaft in a plurality of different positions. The other of the augers 56, 58 may include a receiving-plate 102 with several apertures 104. The apertures 104 are configured to receive a plurality of fasteners 106. The receiving-plate 102 may be welded inside or otherwise fixed to one of the auger cylinders 78, 82. For example, the receiving-plate 102 may be welded to the second cylinder 82, as shown in FIG. 6. The plurality of fasteners 106 may be inserted into the elongated slots 100 and into the apertures 104 when the elongated slots 100 are aligned with the apertures 104. The fasteners 106 may be tightened to secure the receiving-plate 102 to the slide plate 98. In this configuration, the fasteners 106 may be loosened, the augers 56, 58 may be rotated relative to one another about the longitudinal axis 83, and the fasteners 106 may be tightened again. In this way, the first and second augers 56, 58 are fixable in a plurality of different positions relative to each other. It should appreciated that while illustratively the second cylinder 82 has been described as fixed to the receiving-plate 102, in another example the components may be reversed such that the first cylinder 78 is fixed to the receiving-plate 102.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A harvesting assembly for harvesting a crop comprising:
   a frame;
   a cutting knife configured to cut crop;
   a draper assembly including a first side draper configured to move cut crop in a lateral direction, a second side draper configured to move cut crop in the lateral direction, and a center draper positioned between the first side draper and the second side draper;
   a feed drum disposed above the center draper;
   a first auger assembly including:

a first auger positioned above the first side draper, the first auger including (i) a first cylinder having an outer surface and (ii) a first flight defining an outer diameter of the first auger and extending from the outer surface of the first cylinder,
a second auger positioned above the first side draper between the first auger and at least a portion of the feed drum, the second auger including (i) a second cylinder having an outer surface and (ii) a second flight defining an outer diameter of the second auger and extending from the outer surface of the second cylinder, and
a first mounting bracket coupled to the frame, the first auger, and the second auger to support the first auger and the second auger above the first side draper;
wherein the first mounting bracket is positioned laterally between the first auger and the second auger.

2. The harvesting assembly of claim 1, wherein the first auger is fixed relative to the second auger during operation of the harvesting assembly.

3. The harvesting assembly of claim 1, wherein the first cylinder and the second cylinder share a common longitudinal axis extending in the lateral direction, about which the first auger and the second auger are configured to rotate.

4. The harvesting assembly of claim 1, wherein:
the second auger includes a plurality of fingers extending from the outer surface of the second cylinder, and
the first auger is devoid of fingers.

5. The harvesting assembly of claim 4, wherein the plurality of fingers are retractable such that the plurality of fingers move relative to the outer surface of the second auger during rotation of the first auger and the second auger.

6. The harvesting assembly of claim 4, wherein the plurality of auger fingers are stationary fingers and are fixed with respect to the outer surface of the second cylinder during rotation of the first auger and the second auger.

7. The harvesting assembly of claim 1, wherein:
the first mounting bracket is coupled to a monolithic member of the frame, and
the monolithic member extends in the lateral direction adjacent a portion of the first auger and adjacent a portion of the second auger such that the frame prevents the first auger from folding relative to the second auger.

8. The harvesting assembly of claim 1, wherein the first auger assembly includes a rotational mechanism that is coupled to the first auger and the second auger and configured to transfer torque between the first auger and the second auger.

9. The harvesting assembly of claim 8, wherein the first auger and the second auger are fixed relative to the rotational mechanism during operation of the harvesting assembly.

10. The harvesting assembly of claim 9, wherein at least one of the first auger and the second auger is removable from the rotational mechanism.

11. The harvesting assembly of claim 8, wherein at least one of the first auger and the second auger is fixable relative to the rotational mechanism in a plurality of positions each defined by a different degree of rotation about a longitudinal axis of at least one of the first cylinder and the second cylinder.

12. The harvesting assembly of claim 8, wherein:
the first mounting bracket includes a first portion fixed relative to the frame and a second portion coupleable to the first portion,
the rotational mechanism is positioned in a bearing supported by the second portion, and
the second portion is moveable vertically relative to the first portion to adjust the height of the first auger and the second auger relative to the frame.

13. The harvesting assembly of claim 1, further comprising a second auger assembly including:
a third auger positioned above the second side draper, the third auger including (i) a third cylinder having an outer surface and (ii) a third flight defining an outer diameter of the third auger and extending from the outer surface of the third cylinder,
a fourth auger positioned above the second side draper between the third auger and at least a portion of the feed drum, the fourth auger including (i) a fourth cylinder having an outer surface and (ii) a fourth flight defining an outer diameter of the fourth auger and extending from the outer surface of the fourth cylinder, and
a second mounting bracket coupled to the frame, the third auger, and the fourth auger to support the third auger and the fourth auger above the second side draper,
wherein the second mounting bracket is positioned laterally between the third auger and the fourth auger.

14. The harvesting assembly of claim 13, wherein the first cylinder and the third cylinder share a common longitudinal axis.

15. A harvesting assembly for harvesting a crop comprising:
a frame;
a feed drum coupled to the frame;
a first auger assembly including:
a first auger configured to rotate about a first longitudinal axis that extends in the lateral direction,
a second auger configured to rotate about a second longitudinal axis, and
a mounting bracket fixed to the frame and coupled to the first and second auger;
wherein:
the second auger is positioned laterally between the mounting bracket and at least a portion of the feed drum during operation of the harvesting assembly, and
the second auger is removably coupled to the mounting bracket.

16. The harvesting assembly of claim 15, wherein the second auger is fixable in a plurality of positions relative to the first auger each defined by a different degree of rotation of the second auger relative to the first auger about the second longitudinal axis.

17. The harvesting assembly of claim 15, wherein:
the mounting bracket is coupled to a monolithic member of the frame, and
the monolithic member extends in the lateral direction adjacent a portion of the first auger and adjacent a portion of the second auger such that the monolithic member prevents the first auger from folding relative to the second auger.

18. The harvesting assembly of claim 15, wherein:
the second auger includes a plurality of retractable fingers extending from an outer surface of the second cylinder, and
the first auger is devoid of fingers.

* * * * *